UNITED STATES PATENT OFFICE.

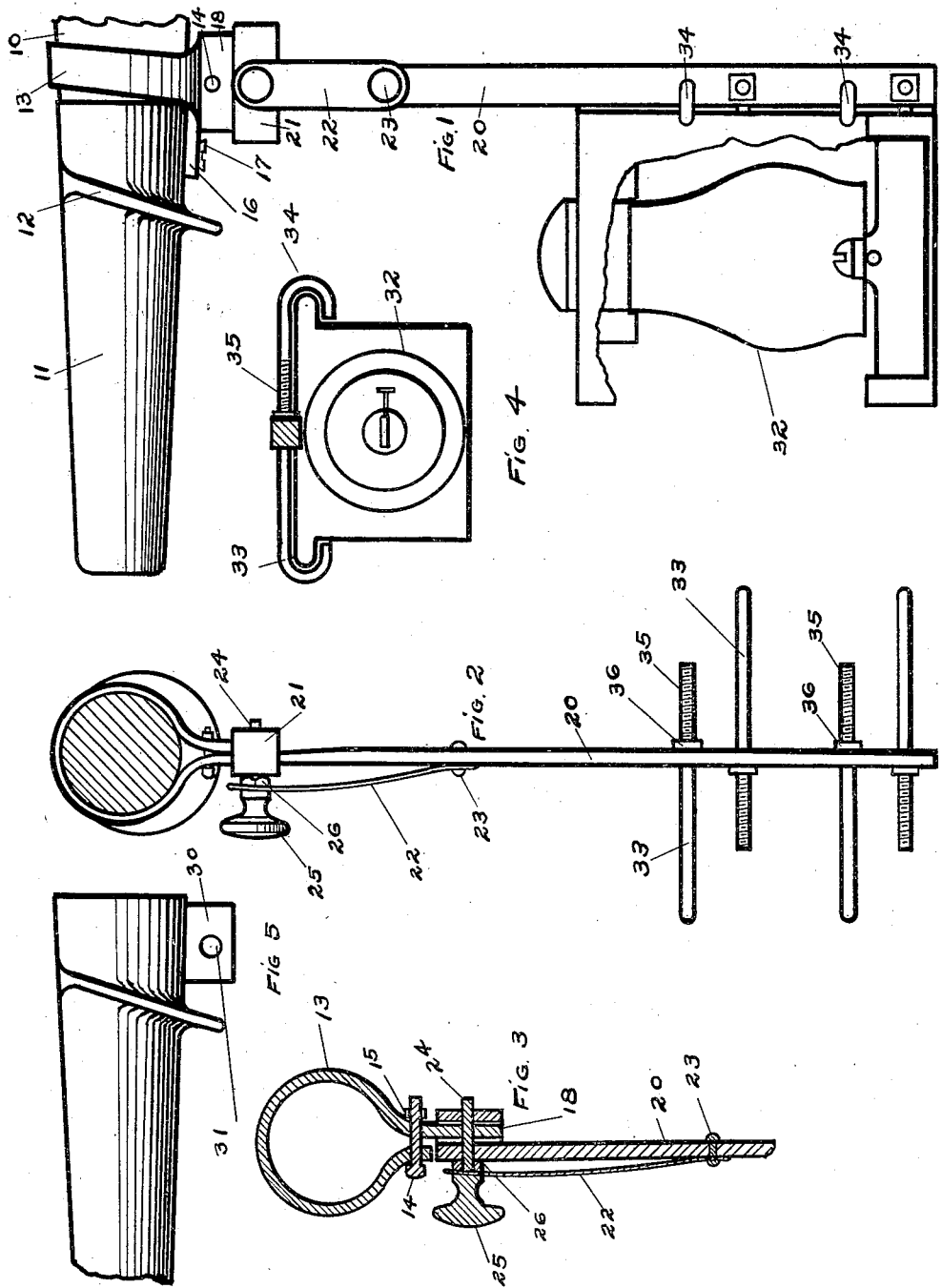

JAMES E. POTTER, OF AUDUBON, IOWA.

LANTERN-HOLDER.

1,055,556.  Specification of Letters Patent.  Patented Mar. 11, 1913.

Application filed January 22, 1912.  Serial No. 672,782.

*To all whom it may concern:*

Be it known that I, JAMES E. POTTER, a citizen of the United States, residing at Audubon, in the county of Audubon and State of Iowa, have invented a new and useful Lantern-Holder, of which the following is a specification.

The object of my invention is to provide a device of simple, durable, and inexpensive construction, whereby a lantern may be detachably secured near the free end of the tongue of a vehicle so that the light may be reflected forwardly from said tongue.

More particularly, it is my object, to provide a lantern holder for vehicles hauled by horses and the like, comprising a bar and simple and inexpensive means for detachably securing said bar to the front of the draft animals, which means may be operated without the use of tools and which has no detachable parts likely to become lost or mislaid.

A further object of my invention is to provide in such a device, means for detachably securing a lantern to the bar above mentioned.

My invention consists in certain details, in the construction, arrangement and combination of the various parts, whereby the objects contemplated are attained, as hereinafter more fully set forth, pointed out in my claims, and illustrated in the accompanying drawings, in which—

Figure 1 shows a side elevation of a lantern holder, embodying my invention, mounted on a tongue, and having a lantern attached thereto. Fig. 2 shows a rear elevation of same, the tongue being shown in section, and the lantern removed. Fig. 3 shows a vertical, central, transverse, sectional view of the upper portion of my improved lantern holder. Fig. 4 shows a top or plan view of the means for securing the lantern to the vertical bar which is shown in section. Fig. 5 shows a modified form of the portion of my device which is secured to the tongue.

On a vehicle drawn by draft animals, it is difficult to mount a lantern in such a position that the animals do not interfere with the light. Lanterns fastened to the dash in the ordinary way, or to the sides of the vehicle frame, show the animals and the road at the side of the animals, but are not properly arranged to throw light on the road, directly in front. It is my purpose to provide a device for hanging a lantern on the tongue in front of the draft animals, so that the rays of light may be thrown directly forward, and are not interfered with by the animals.

In the accompanying drawings, I have used the reference numeral 10 to indicate a portion of a vehicle tongue. In ordinary buggies, the free end of the tongue is provided with a cap 11 somewhat tapered and having a flange 12 adapted to limit the rearward movement of the neck yoke on the tongue. I preferably secure my improved lantern holder to the tongue just in the rear of the neck yoke, although it may be secured to the tongue at any convenient point near the free end thereof, where it will not be interfered with by the harness or the draft animals. In Figs. 1, 2 and 3, I have shown a clamp 13, composed of a flat piece of strap iron, or other suitable material, bent around the tongue, and secured together at its ends by a bolt 14, on which is a nut 15. On the lower side of the clamp 13, is a forward extension 16, designed to be secured to the tongue or to the cap 11 as desired, by means of a screw 17, or other suitable means. By means of the screw 17 and the extension 16, the bracket 13 is held against movement with relation to the tongue. One of the ends of the strap iron of which the bracket is composed, is preferably extended downwardly, forming a portion 18, which is angular in cross section. For detachably mounting a lamp on the bracket 13, I provide a bar 20. At the upper end of the bar 20, is formed a socket 21 to receive the portion 18. The opening in the socket 21 is angular and designed to receive the angular portion 18. I provide a transverse opening in the portion 18 and transverse openings in the socket 21, which register with the opening in the portion 18 when said portion is received in said socket.

For detachably securing the bar 20 to the portion 18, I secure a flat piece of spring metal 22, by means of a rivet 23 or other suitable means to the bar 20, at a point below the socket 21. Slidably mounted in the openings in the socket 21, is a pin 24 on one end of which is a head 25. In the pin 24, adjacent to the head 25, I mount a nut 26 and the spring 22 is mounted on the pin 24 between the nut 26 and the head 25. The normal position of the spring 22 and its resiliency are such that the pin 24 is normally held by yielding pressure in the openings in the socket 21, or by drawing the head 25 away from the socket 21, against the yielding pressure of the spring 22 and its resiliency is such that the pin 24 is normally held by yielding pressure in the openings in the socket 21, or by drawing the head 25 away from the socket 21, against the yielding pressure of the spring 22, the pin 24 may be withdrawn from the transverse openings in said socket. In mounting the bar 20 on the portion 18, I withdraw the pin 24 from the transverse openings in the socket 21 and insert the portion 18 into said socket to position where the transverse openings in the socket and the opening in the portion 18 register with each other. The pin 24 is then released and the resiliency of the spring 22 holds the nut 26 against the outside of the socket 21 with the pin 24 received in the transverse openings in said socket and in the opening 18 as shown in Fig. 2.

On account of the angular form of the portion 18 and the angular opening in the socket 21, the bar 20 is held in vertical position rigidly with relation to the bracket 13 with relation to the tongue.

In Fig. 5 I have shown a modified form of the bracket 13 comprised of an angular piece 30 similar in form to the portion 18, provided with a transverse opening 31 of similar size to the transverse opening in the portion 18, and similarly located.

For detachably securing the lantern to the bar 20, any suitable means may be employed. In the drawings, I have shown an ordinary lantern 32, having a flat back, the sides of which, extend beyond the sides of the lantern. For mounting such a lantern on the bar 20, I provide a series of rods slidably and horizontally mounted in the bar 20. One end of each of the rods 33 is curved to form a hook 34. The other end of each rod 33 is screw threaded at 35 and provided with a nut 36. The lantern 32 is placed with its back adjacent the bar 20 and the edges of the back, are engaged by the hooks 34. The hooks 34 on the alternate rods 33, engage opposite sides 33 of the back of the lantern. The nuts 36 are screwed farther on the rods 33 until the lantern is held tightly in position.

In the practical use of my improved lantern holder, I secure the bracket 13 to the tongue. I then secure the lantern to the bar 20. It will be understood that by means of the rods 33 and the hook Nos. 34 thereon I am enabled to secure to the bar 20 almost any kind of lantern. Where the lantern has upright frame members on the sides which are located in front of the rear end of the lantern I can readily mount the lantern on the bar all right by bending the rods 33. Let it be understood that the rods No. 33 and the hook Nos. 34 thereon are made of malleable material. The bar 20 may be detachably mounted on the portion 18 in the manner hereinbefore described, and may be quickly and easily removed therefrom, when desired. In my device, the lantern is held rigidly in front of the draft animals and between them if a pair of such animals are employed. The lantern is in position where it is not interfered with by the knees of the draft animals and is held rigidly in position with relation to the tongue. The rays of light are directed forwardly from the draft animals and are not interfered with by them. The lantern may be quickly and easily mounted on the tongue or removed therefrom. It may be easily detached from the bar 20, and used for other purposes.

I claim as my invention:

1. In a device of the class described a securing device designed to be mounted on a vehicle tongue, a bar depending therefrom, means for detachably mounting said bar on said securing device, said bar being provided with a plurality of holes and means for fastening a lantern to said bar said means providing a plurality of said rods loosely mounted in said holes and nut on one end of each of said rods said rods being provided with hook members on the outer or free end.

2. In a device of the class described a bar means for detachably mounting the same on a vehicle tongue, said bar being provided with a plurality of holes, a plurality of rods loosely mounted in said holes, said rods being screw threaded at one end and provided with hook members at the other ends and nuts on said rods for adjustably securing them to a lantern.

3. In a device of the class described the combination of a bar bent to a form to surround a vehicle tongue with its ends adjacent to each other and extending downwardly from the tongue, one of the ends extending below the other and being angular in cross-section, said bar being formed with a laterally extending flange designed to fit and be secured to a tongue and depending bar having at its upper end an annular socket designed to receive the downwardly extending angular end of said first bar, said last named end and the sides of said socket being provided with openings which register with each other and a spring controlled pin received in said openings.

Des Moines, Iowa, January 4, 1912.

JAMES E. POTTER.

Witnesses:
E. H. JACOBSEN,
WM. NORTHUP.